W. W. CRATE.
MOLD FOR MAKING ARTIFICIAL TEETH.
APPLICATION FILED APR. 2, 1918.
1,297,448.
Patented Mar. 18, 1919.
2 SHEETS—SHEET 2.
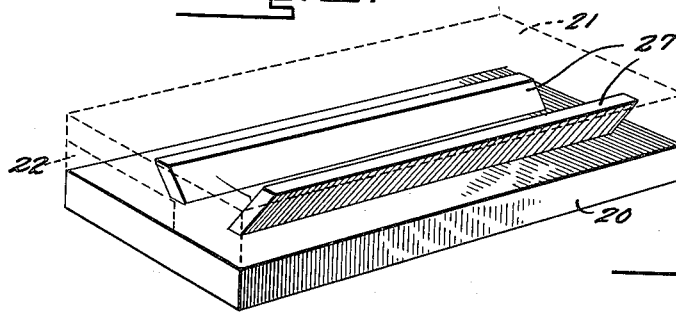
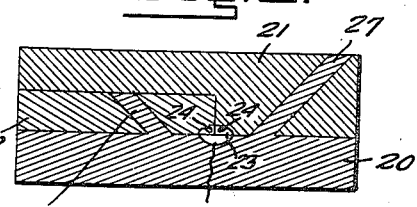
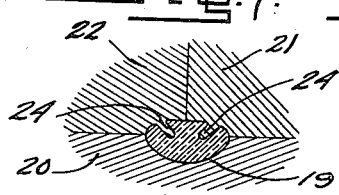
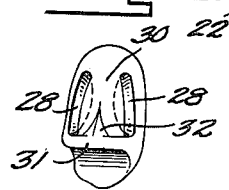
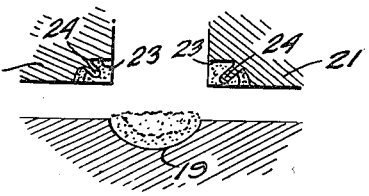
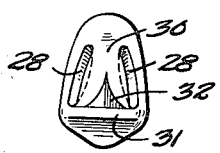
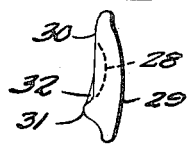
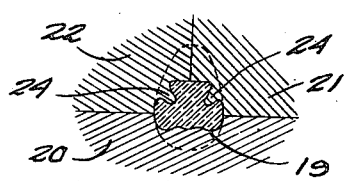
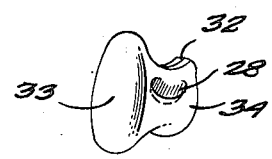
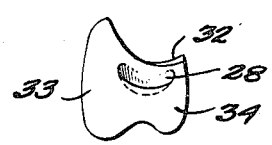
Inventor
Walter W. Crate,
By Lancaster & Allwine
his Attorneys.

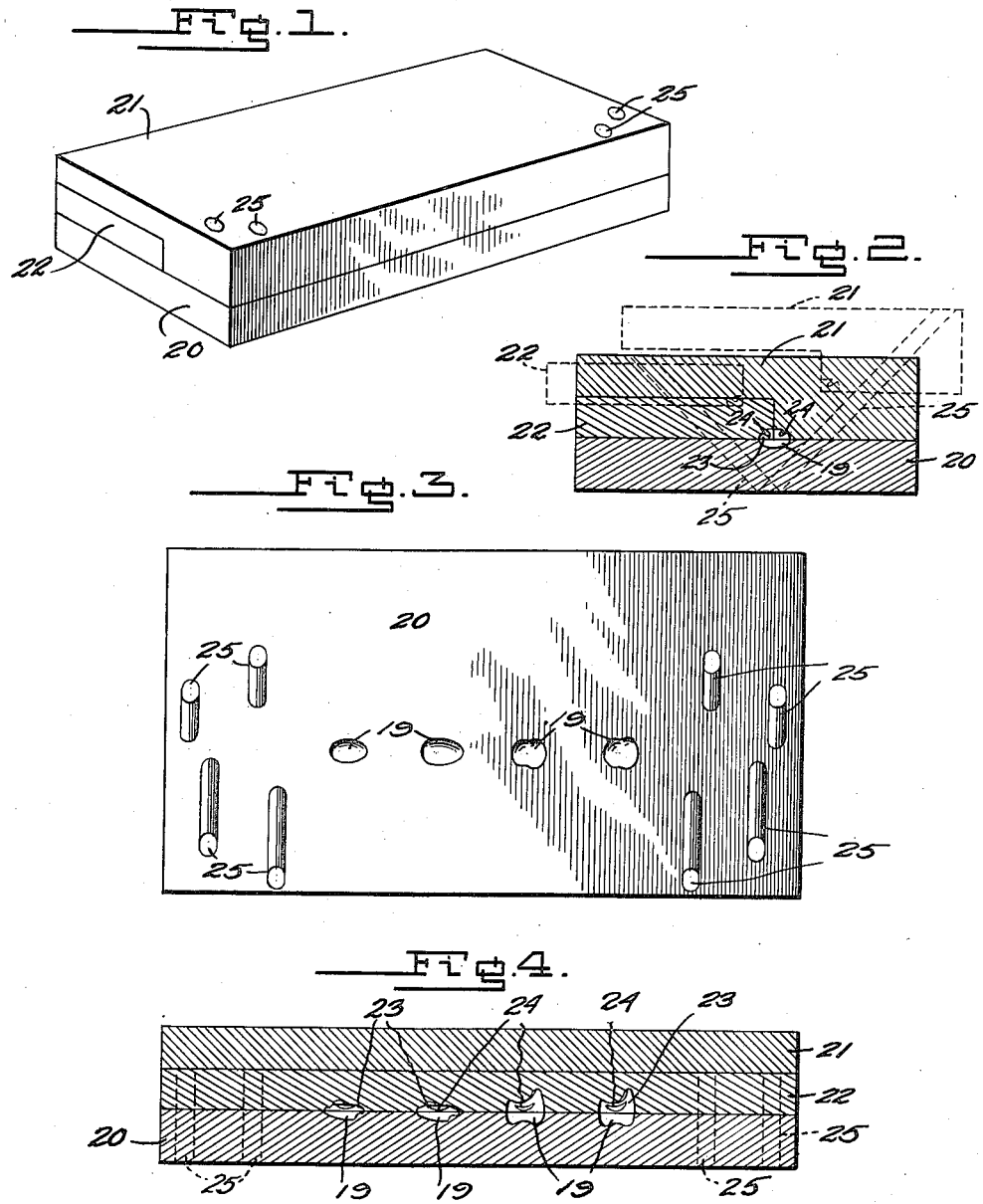

UNITED STATES PATENT OFFICE.

WALTER W. CRATE, OF CAMDEN, NEW JERSEY.

MOLD FOR MAKING ARTIFICIAL TEETH.

1,297,448.

Specification of Letters Patent. Patented Mar. 18, 1919.

Application filed April 2, 1918. Serial No. 226,276.

*To all whom it may concern:*

Be it known that I, WALTER W. CRATE, a citizen of the United States, and a resident of Camden, in the county of Camden and State of New Jersey, have invented certain new and useful Improvements in Molds for Making Artificial Teeth, of which the following is a specification.

This invention relates to the art of dentistry, and has particular reference to the production of artificial teeth.

The object of this invention is to facilitate the permanent attachment of artificial teeth to the supporting plate without the use of metal parts, such as platinum, and to facilitate the construction of teeth with angularly disposed grooves or recesses therein without weakening the teeth by cutting, and to admit the crusting or hardening of the walls of the grooves during baking and firing.

Another object of this invention is to provide an improved mold by the use of which the face, which may be of porcelain, and the body, which may be a filler of any suitable colored or tinted material, of the teeth may be separately worked into the parts of the mold; the internal surfaces or walls of angularly disposed grooves may be molded in the teeth in the original formation; and the teeth, subsequent to baking and drying out, may be easily removed from the mold without injury to the teeth.

Various other objects and advantages of this invention will be in part brought out in, and in part understood from, the following detailed description of the present preferred embodiment illustrated in the accompanying drawings, and by the use of such embodiment the method or process of this invention may be practised.

In the drawings:

Figure 1 is a perspective view of an artificial tooth mold constructed according to this invention.

Fig. 2 is a transverse section through the same, the dotted lines showing the upper sections partly raised.

Fig. 3 is a detailed enlarged top plan view of the base of the mold.

Fig. 4 is a longitudinal vertical section through the mold.

Fig. 5 is a detail perspective view of a modified form of the base for the mold, the dotted lines showing the upper sections in closed position thereon.

Fig. 6 is a transverse section through the modified form of mold shown in Fig. 5.

Fig. 7 is a fragmentary section through the mold showing a cuspid tooth in the mold.

Fig. 8 is a rear side perspective view of the cuspid tooth removed from the mold.

Fig. 9 is a rear elevation of the same.

Fig. 10 is an edge elevation of the tooth.

Fig. 11 is a fragmentary sectional view through the mold showing a bicuspid tooth therein.

Fig. 12 is a detail perspective view of the molded bicuspid tooth.

Fig. 13 is a side elevation of the same.

Fig. 14 is a rear elevation of the bicuspid tooth produced.

Fig. 15 is a fragmentary section of the mold with the sections thereof partly separated and showing the cavities of the sections filled with the respective portions of the plastic material of which the tooth may be formed.

Referring first to the embodiment of the mold illustrated in the accompanying drawings, and by means of which the method or process of this invention may be practised, the mold body comprises three sections 20, 21 and 22 which are separable from one another, and which may be formed of any suitable material capable of withstanding the necessary heat for baking and drying out the artificial teeth placed in the mold.

The sections of the mold may be formed of a bronze composition, preferably having sulfur as an alloy, and the section 20 may be termed the lower or base section and is preferably in the form of a flat rectangular plate of the desired length and width and which is provided in its upper face with a plurality of depressions or cavities 19 of various formations and the walls of which are adapted to mold or conform plastic material worked into the cavities to the configuration of the front faces of teeth of various types, such as: incisors, cuspids, bicuspids, molars, crowns and facings. The cavities 19 are of sufficient depth to receive substantially one-third of the respective teeth.

The sections 21 and 22 of the mold comprise the upper complemental sections of the mold, and the sections 21 and 22 are superposed one upon the other with the section 22 reduced in width and thickness relatively to the section 21 and the latter section having a recess in its underside extending from one marginal edge inward to the longitudinal central line or axis of the mold. The lower faces of the sections 21 and 22 are adapted to meet directly over the cavities 19 formed in the upper face of the base section 20, which cavities 19 are disposed in longitudinal alinement within the base section. As shown to advantage in Figs. 2 and 4, the sections 21 and 22 are provided with complemental cavities 23 which, when the sections of the mold are assembled as shown, form together with the cavities 19 and the base portion 20, a suitable mold for shaping plastic material to the desired configuration of the teeth to be represented. Projections 24 are formed upon the walls of the cavities 23 in the mold sections 21 and 22 and converge downward toward the cavities 19. These projections 24 are adapted to engage in the plastic material placed in the mold and to serve as cores for forming or molding grooves which converge inwardly from the rear respective sides of the back of the teeth. From Fig. 2, it will be noted that the projections 24 extend at substantially 45° downward to form converging grooves in the finished teeth, and, correspondingly, as to number of teeth molded, any desired number of the projections 24 may be provided. From Fig. 4 it will be noted that the projections 24 taper in height at opposite ends and also taper in width toward their free edge portions. The molded teeth are thus provided with correspondingly shaped or converging grooves or recesses into which material of the supporting plate which in plastic form, and prior to vulcanization is forced.

In positioning and removing the complemental sections 21 and 22 of the mold, it is necessary that the sections be raised from the base section 20 in a general direction in parallelism with the direction in which the respective projections 24 extend. It is also essential that when the parts of the mold are assembled, the projections be engaged in the plastic substance by a movement of the projections in a similar direction, should the cavities 23 in the sections be not first filled or packed with the plastic substance. To effect this result, the base section 20 is provided with guiding means for each upper section 21 and 22. In Figs. 1, 2 and 3, the guiding means is shown in the form of pairs of upwardly diverging posts 25, the same being inclined in substantially the same angle of inclination of the projections 24 arranged within the sections 21 and 22. As shown in Fig. 3, the posts 25 are preferably arranged in staggered relation for each section 21 and 22 for holding the sections from vibrating upon the posts for insuring protection to the molded article during the separation of the sections. The sections 21 and 22 are provided with inclined openings or guideways adapted to snugly receive the posts 25, the walls of the guideways serving to hold the sections from vibrating unduly upon the posts and for insuring the advancement of the sections toward each other, and the separation of the sections, in the required direction.

In Figs. 5 and 6 is shown a slightly modified form of the guiding means for the upper sections 21 and 22. In lieu of the posts 25, the guides are in the form of upwardly diverging flanges 27 which may be formed integral with the base section 20 and which, like the posts 25, terminate at their upper edges or ends flush with the upper surfaces of the respective sections 21 and 22. The guides 27 are inclined at the required angle, and the sections 21 and 22 are correspondingly slotted to form guideways for receiving the guides 27.

Referring now to the method or process which may be practised by use of the above described mold of this invention, the respective cavities 19 and 23 of the mold sections are packed with plastic ceramic material. It is preferable to pack the cavities 19 in the base section 20 with porcelain to form the front surface or face of the teeth, and to pack the cavities 23 in the sections 21 and 22 with a suitable filler which may be colored or tinted. The porcelain used is sufficiently transparent to expose the coloring in the filler. The filler is packed in the cavities 23 about the projections 24 and in sufficient quantity to engage the portions of the material in the respective cavity 19 of the base section. The upper sections 21 and 22 are now advanced down against the base section 20 and over the guides 25 or 27, the upper sections meeting in a longitudinal plane directly above the cavities 19. The separate portions of the plastic material are thus brought together and are compressed by the clamping of the sections of the mold together in any suitable manner. In the mold shown, the base section 20 is provided with a plurality of cavities 19 of different configurations so that artificial teeth of various characters may be molded and baked or dried out simultaneously. As the projections 24 are embedded in the plastic material, the grooves or recesses are originally formed in the molding of the teeth, and are not cut or otherwise produced in the baked tooth as is the usual custom, and which frequently occasions the breakage of the teeth, or grooves too deeply cut. As shown in the detail views on Sheet 2, the projections 24 form converging grooves or recesses 28 in the back of the teeth which extend either lengthwise of the teeth, as shown particularly in Fig. 8 or in opposite sides of the back of the teeth as shown in Fig. 12. These recesses or grooves 28 are adapted to receive the plastic material of the supporting plate therein, and the plate when vulcanized is adapted to interlock with the teeth and hold the same securely to the plate.

The tooth produced may be of the form shown in Figs. 7 to 10, and wherein the front wall or face 29 of the tooth is molded to the desired convexity, and the back wall 30 is formed relatively flat and with the grooves 28 spaced apart therein and spaced inwardly from the lateral portions of the tooth. The walls and edges of the grooves 28 are treated in the same manner as are the exterior surfaces and edges of the tooth so that the original hardness and finish of the exterior surnal faces of the tooth are imparted to the walls of the grooves. The tooth produced is therefore relatively strong as the grooves are inherent in the construction or molding of the tooth and the liability of cracking or damaging the tooth by cutting tools is eliminated. The lower end of the tooth is reduced, and has a downwardly facing ridge 31 extending across its back wall, and a substantially triangular projection 32 rising from the ridge between the slots or grooves 28, the projection tapering upward and merging into the rear face 20 of the tooth.

The method and mold above described may also produce the tooth illustrated in Figs. 11 to 14. In this form the face 33 is given the outer contour of a bicuspid, and the inner wall or portion 34 is molded into a shape having the spaced grooves 28 therein and spaced inwardly from the lower widest portion of the tooth. As in the other forms of teeth, the rear portion 34 has the triangular projection 32 merging into the tooth between the grooves, and the grooves are inherently formed in the tooth structure and the walls of the grooves receive the original hardness and finish resulting from the molding, the baking, and the firing of the tooth.

After the tooth has been molded, or the plastic body compressed between the sections of the mold, the sections are clamped together and the mold is subjected to heat sufficient for baking the plastic material and drying it out to thus effect the material. The upper sections 21 and 22 of the mold are now separated as above described, and the plastic body is removed from the mold, the plastic body having in its inherent formation the grooves 28. The molded teeth are then subjected to a temperature of from 24 to 27 hundred degrees for firing or burning the molded, baked composition or substance to the desired hardness, and to impart the desired finish to the article. During the baking, and also during the firing, the inner walls of the grooves 28 are subjected to the same treatment as are the exterior walls of the tooth body, so that the inner walls of the grooves are suitably hardened and finished and are thus in condition to receive the pliable substance to form the plate, and the portion of the tooth body adjacent the groove or grooves formed therein is strengthened and reinforced so that the tooth is rigidly anchored to the plate when the latter is vulcanized in the usual manner.

I claim:

1. In a mold the combination of three or more separable main sections having cavities at their meeting portions and with at least, two of the sections having projections in their respective cavities inclined toward the cavity of the remaining section.

2. In a mold, the combination of more than two sections having cavities in their meeting portions adapted to form when assembled the concavity of the mold, and a projection carried upon one of the sections extending downwardly into the cavity thereof in a direction at an angle to the perpendicular axis of the cavity.

3. In a mold the combination of a base section and a plurality of superposed sections, said sections having cavities at their meeting portions forming when assembled the cavity of the mold, the superposed sections having in their cavities projections inclining toward the cavity of the base section, and the said superposed sections being adapted for movement toward and from the base section in the longitudinal planes of their respective projections.

4. In a mold for artificial teeth, the combination of a plurality of sections adapted to be assembled and provided with cavities at their meeting portions forming the interior chamber of the mold and the sections being adapted to individually receive plastic substances in the cavities thereof, one portion of said mold chamber being a base portion, and an adjacent section provided with a projection inclined toward said base portion of the chamber and adapted to inherently form an inclined groove in the tooth molded, said section with the projection being adapted to be removed from the article molded in the direction of the plane of the projection for longitudinally withdrawing the projection from the groove.

5. In a mold for artificial teeth, the combination of a base section having a cavity therein, and a pair of complementary upper sections having cavities at their meeting portions and arranged to meet immediately over the cavity of the base section, the upper sections also having projections inclined toward the cavity of the base section, said sections being adapted to separably receive a plastic substance in the cavities thereof and the sections when assembled being adapted to compress the plastic substances into a homogeneous plastic mass.

6. In a mold for artificial teeth, the combination of a base section having a cavity therein, a pair of superposed complementary sections having cavities in their meeting portions and adapted to meet immediately over the cavity of the base section, said complementary sections having projections in the cavities thereof and the projections converging toward the cavity of the base section, said complementary sections being adapted to be removed from the base section in the directions of the planes of the projections of the respective sections.

7. In a mold for artificial teeth, the combination of a base section having a cavity therein, a pair of superposed sections adapted to fit upon the base section and having cavities at their meeting portions and adapted to meet immediately over the cavity of the base section, said superposed section provided with projections in the cavities thereof and the projections converging downwardly toward the cavity of the base section, and guides projecting upwardly from the base section in substantially parallelism with the projections of the sections when the latter are in place and adapted to engage the upper sections for guiding the same when moved toward and from each other and the base section.

8. A mold for artificial teeth comprising a base section having a cavity therein, a pair of superposed sections adapted to interfit upon the base section and provided with cavities in their meeting portions adapted to register over the cavity of the base section, inclined guides rising at an angle from the base section and adapted to engage said superposed sections for guiding the same when moved toward and from each other and the base section, the superposed sections provided with projections in the cavities thereof extending substantially in parallelism to the guides of the respective section to mold at least two undercut grooves in the teeth with one groove at an angle to another groove and to admit the withdrawal of the projections longitudinally from the grooves.

9. In a mold for artificial teeth, the combination of a base section having a cavity therein, a pair of superposed complementary sections having cavities in their meeting portions and adapted to meet immediately over the cavity of the base section, said complemental sections having inclined projections in the cavities thereof, said complementary sections being adapted to be removed from the base section in the directions of the planes of the projections of the respective sections.

10. In a mold, the combination of a plurality of sections having cavities in their meeting portions to form the chamber of the mold, one section having a projection in the cavity thereof inclined at an angle toward the cavity of another section, and means for guiding said first section for movement from the other sections of the mold in the direction of the longitudinal axis of the projection.

WALTER W. CRATE.